US010979118B1

(12) United States Patent
Foster et al.

(10) Patent No.: US 10,979,118 B1
(45) Date of Patent: Apr. 13, 2021

(54) DISTRIBUTED BEAMFORMING SYSTEM WITH USER SIDE BEAMFORMING PROCESSING

(71) Applicant: The Boeing Company, Chicago, IL (US)

(72) Inventors: Christopher Jason Foster, Long Beach, CA (US); Daniel Roukos, Hermosa Beach, CA (US); Kyle William Jewett, Torrance, CA (US); Christ Tzelepis, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/794,688

(22) Filed: Feb. 19, 2020

(51) Int. Cl.
*H04B 7/06* (2006.01)
*H04B 7/26* (2006.01)

(52) U.S. Cl.
CPC ......... *H04B 7/0617* (2013.01); *H04B 7/2621* (2013.01); *H04B 7/2628* (2013.01); *H04B 7/2643* (2013.01)

(58) Field of Classification Search
CPC .......... H04B 7/02; H04B 7/04; H04B 7/0408; H04B 7/0413; H04B 7/0452; H04B 7/0491; H04B 7/0495; H04B 7/06; H04B 7/0613; H04B 7/0615; H04B 7/0617; H04B 7/068; H04B 7/2621; H04B 7/2628; H04B 7/2643
See application file for complete search history.

(56) References Cited

U.S. PATENT DOCUMENTS

| | | | |
|---|---|---|---|
| 2004/0190598 A1* | 9/2004 | Seki | H04B 7/0669 375/141 |
| 2005/0157683 A1* | 7/2005 | Ylitalo | H04B 7/0652 370/334 |
| 2007/0110198 A1 | 5/2007 | Skarby et al. | |
| 2011/0137765 A1* | 6/2011 | Nonaka | G06Q 20/32 705/30 |
| 2015/0022401 A1* | 1/2015 | Gavilan | H01Q 1/243 343/702 |

(Continued)

OTHER PUBLICATIONS

Non-Final Office Action, U.S. Appl. No. 16/794,698, pp. 1-14, dated May 15, 2020.

(Continued)

*Primary Examiner* — Siu M Lee

(57) ABSTRACT

A distributed beamforming system includes a platform terminal and a plurality of user terminals. The platform terminal includes an antenna array including a plurality of antenna elements. Each antenna element transmits a wide-area beam configured to encompass each of the plurality of user terminals. The platform terminal also includes one or more processors in electronic communication with the antenna array and a memory coupled to the one or more processors. The memory stores data into a database and program code that, when executed by the one or more processors, causes the platform terminal to receive an incoming signal and split the incoming signal into a plurality of individual wireless signals. Each individual wireless signal corresponds to one of the plurality of antenna elements of the antenna array. The system also transmits the plurality of individual wireless signals to the user terminal by the antenna array.

20 Claims, 7 Drawing Sheets

(56) References Cited

U.S. PATENT DOCUMENTS

| | | |
|---|---|---|
| 2015/0124911 A1 | 5/2015 | Wicker, Jr. et al. |
| 2017/0085307 A1 | 3/2017 | Yazdani et al. |
| 2018/0351619 A1 | 12/2018 | Khan |
| 2020/0028556 A1* | 1/2020 | Inoue .................. H04B 7/0695 |
| 2020/0145096 A1 | 5/2020 | Buer et al. |

OTHER PUBLICATIONS

Notice of Allowance, U.S. Appl. No. 16/794,698, pp. 1-8, dated Sep. 29, 2020.

* cited by examiner

DISTRIBUTED BEAMFORMING SYSTEM WITH USER SIDE BEAMFORMING PROCESSING

INTRODUCTION

The present disclosure relates to a distributed beamforming system. More particularly, the present disclosure is directed towards a distributed beamforming system having a platform terminal including a phased array of antenna elements and a plurality of user terminals, where each user terminal generates a beamformed signal.

BACKGROUND

Beamforming is a signal processing technique that directs a radiation pattern created by an array of antenna elements towards a receiving device rather than have the radiation pattern spread in all directions. A multi-access beamforming payload allows for multiple receiving devices to share an allotted spectrum. If the receiving devices are capable of movement, then the system may require the beams either track the movement of the receiving devices or employ a priori known or communicated geometry.

Existing solutions employ either on-board beamforming or gateway-side ground-based beamforming. When beamforming processing is performed by a processor that is co-located on the same platform as the antenna array, this is referred to as on-board beamforming. Alternatively, if the signal processing is performed by a gateway that is remotely located from the antenna array, this is referred to as a ground-based beamforming. Each beamforming technique has its advantages and disadvantages. For example, gateway-side ground-based beamforming systems include a bandwidth expansion that is proportional to the number of antenna elements. As a result, an operator may need to secure additional spectrum between the gateway and the platform. However, gateway-side ground-based beamforming systems place the beamforming processor at the gateway, which may enable additional processing power that would have not been possible at a remote site where the platform may be located.

SUMMARY

According to several aspects, a distributed beamforming system including a platform terminal and a plurality of user terminals is disclosed. The platform terminal includes an antenna array including a plurality of antenna elements, where each antenna element transmits a wide-area beam configured to encompass each of the plurality of user terminals. The system also includes one or more processors in electronic communication with the antenna array and a memory coupled to the one or more processors. The memory stores data into a database and program code that, when executed by the one or more processors, causes the platform terminal to receive an incoming signal and split the incoming signal into a plurality of individual wireless signals. Each individual wireless signal corresponds to one of the plurality of antenna elements of the antenna array. The system also transmits the plurality of individual wireless signals to each user terminal by the antenna array. Each antenna element transmits a single individual wireless signal, and the plurality of individual wireless signals are orthogonal with respect to one another.

In another aspect, a method of wireless communication between a platform terminal and a plurality of user terminals that are part of a distributed beamforming system is disclosed. The includes receiving, by the platform terminal, an incoming signal and splitting the incoming signal into a plurality of individual wireless signals. Each individual wireless signal corresponds to one of a plurality of antenna elements of an antenna array of the platform terminal. The method also includes transmitting the plurality of individual wireless signals to each user terminal by the antenna array. Each of the plurality of antenna elements transmits a single individual wireless signal as a wide-area beam, and the individual wireless signals are orthogonal with respect to one another.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to a distributed beamforming system including a plurality of user terminals and a platform terminal. The platform terminal includes an antenna array having a plurality of antenna elements, where each antenna element emits a wide-area beam that encompasses all of the user terminals that are part of the distributed beamforming system. The platform terminal transmits a plurality of individual wireless signals that are orthogonal with respect to one another based on frequency, time, or by coding techniques. It is to be appreciated that there is a one-to-one mapping of each individual wireless signal to each of the antenna elements located on the platform terminal. The individual wireless signals are received by each individual user terminal. The user terminals apply an amplitude weight and a phase shift to each of the individual wireless signals. The individual wireless signals are then combined together at the individual user terminals to generate a beamformed signal. It is to be appreciated that the disclosed beamforming system includes user side beamforming processing. In other words, the beamforming processing is performed at the user terminals, where the user terminals form the beamformed signal. In contrast, conventional systems perform the beamforming processing at a gateway terminal or a satellite, and the individual wireless signals are combined together in the free space between the platform terminal and the user terminals.

The following description is merely exemplary in nature and is not intended to limit the present disclosure, application, or uses.

Figure 1:
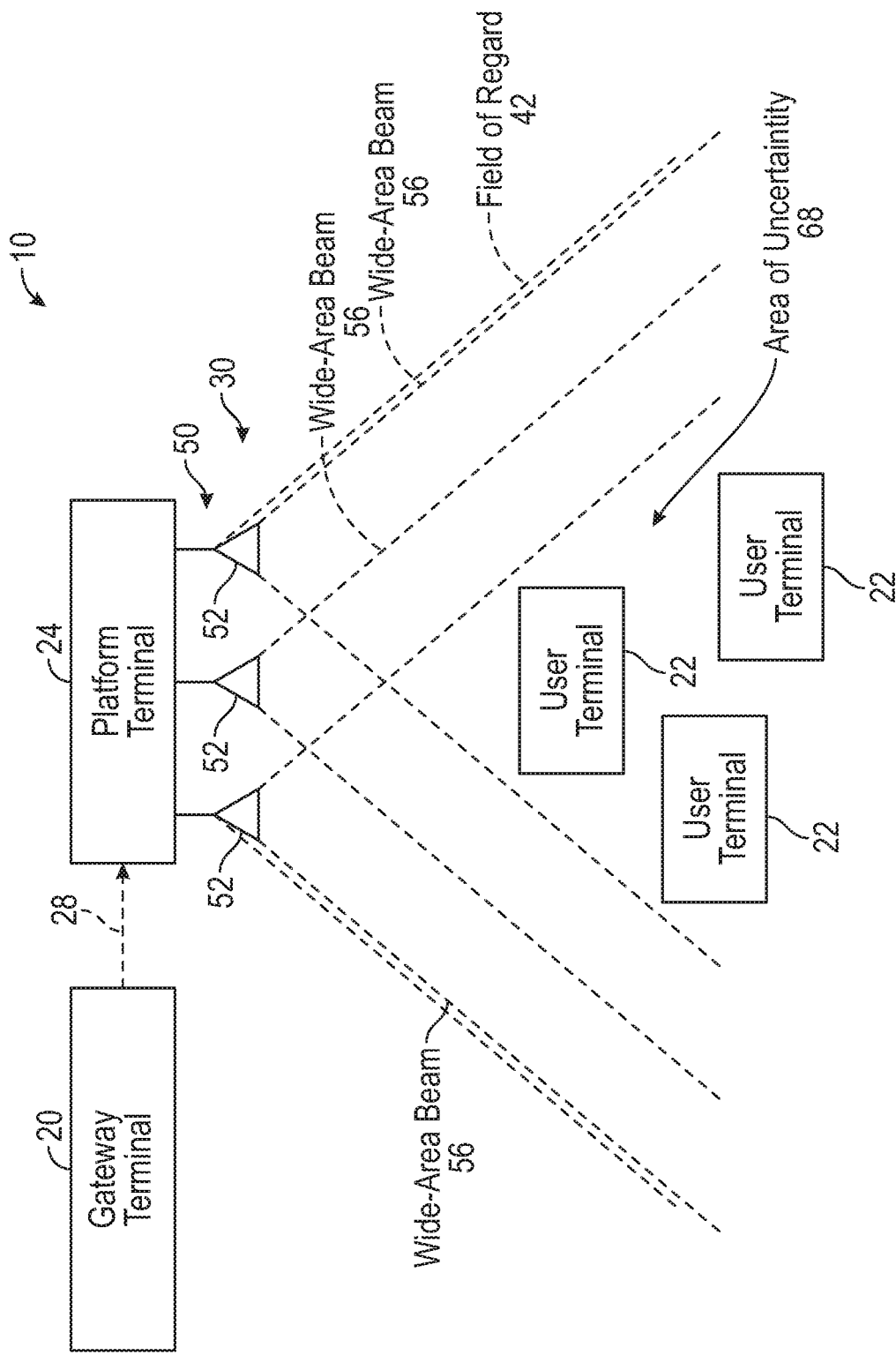
FIG. 1 is a schematic diagram of the disclosed distributed beamforming system including a plurality of user terminals and a platform terminal, according to an exemplary embodiment.

Referring to FIG. 1, an exemplary communications system 10 is shown. The communications system 10 includes one or more gateway terminals 20, a plurality of user terminals 22, and one or more platform terminals 24. The gateway terminal 20 represents a source of signals. In the embodiment as shown in FIG. 1, the gateway terminal 20 is in electronic communication with the platform terminal 24 by an electronic connection 28. The electronic connection 28 is a wireless signal or, alternatively, a cable connection that electronically connects the gateway terminal 20 and the platform terminal 24 to one another. In one non-limiting embodiment, the gateway terminal 20 receives the signals from an external source, such as a satellite (not shown). Alternatively, in another embodiment, the gateway terminal 20 generates the signals. Each of the plurality of user terminals 22 are in wireless communication with the platform terminal 24. Accordingly, the user terminals 22 receive signals from the platform terminal 24.

The communications system 10 includes a distributed beamforming system 30, where the beamforming system 30 includes the plurality of user terminals 22 and the platform terminal 24. As explained below, the distributed beamforming system 30 is configured to process beamforming signals at each of the plurality of user terminals 22. In one embodiment, the gateway terminal 20, the plurality of user terminals 22, and the platform terminal 24 are fixed in a particular location. However, in another embodiment, the gateway terminal 20, the plurality of user terminals 22, and the platform terminal 24 are mobile. Each of the user terminals 22 correspond to a user of the communications system 10. Some examples of user terminals 22 include, but are not limited to, a mobile electronic device such as a smartphone, an aircraft, a spacecraft, or a ground station. The gateway terminal 20, the plurality of user terminals 22, and the platform terminal 24 may be terrestrial, aerial, or located in space. For example, in an embodiment, the platform terminal 24 is part of a spacecraft or an aircraft. The user terminals 22 are distributed in various geographical locations and spaced apart from one another.

The platform terminal 24 includes an antenna array 50 including a plurality of antenna elements 52, which may be referred to as a phased array of antenna elements 52. The antenna array 50 includes a field of regard 42. The user terminals 22 are each located within the field of regard of the antenna array 50 of the platform terminal 24. As seen in FIG. 1, the antenna elements 52 each emit a wide-area beam 56. The wide-area beams 56 emitted by each of the antenna elements 52 overlap one another to define an area of uncertainty 68. The area of uncertainty 68 represents a location where all of the plurality of user terminals 22 that are part of the distributed beamforming system 30 are located. The number of antenna elements 52 of the antenna array 50 of the platform terminal 24 is equal to a total number of user terminals 22 that are located within the area of uncertainty 68.

In the event one or more of the user terminals 22 are mobile, then the area of uncertainty 68 accounts for movement of each user terminal 22. For example, if the user terminals 22 are limited to movement within the continental United States, then the area of uncertainty 68 would include the entire continental United States. In other words, an individual user terminal 22 is restricted in movement to the area of uncertainty 68 of the distributed beamforming system 30. Accordingly, it is to be appreciated that the platform terminal 24 may not know the location of each user terminal 22. In other words, since the antenna elements 52 each emit a wide-area beam 56 that encompasses each of the user terminals 22, it is not necessary for the platform terminal 24 to have knowledge the location of each user terminal 22. Therefore, it is not necessary for the platform terminal 24 to track the location of any mobile users that change location. Additionally, the user terminals 22 do not need to reveal their location to the platform terminal 24. In contrast, conventional on-board beamforming systems generate beams that either track the movement of the receiving devices or employ a priori known geometry.

Figure 2:
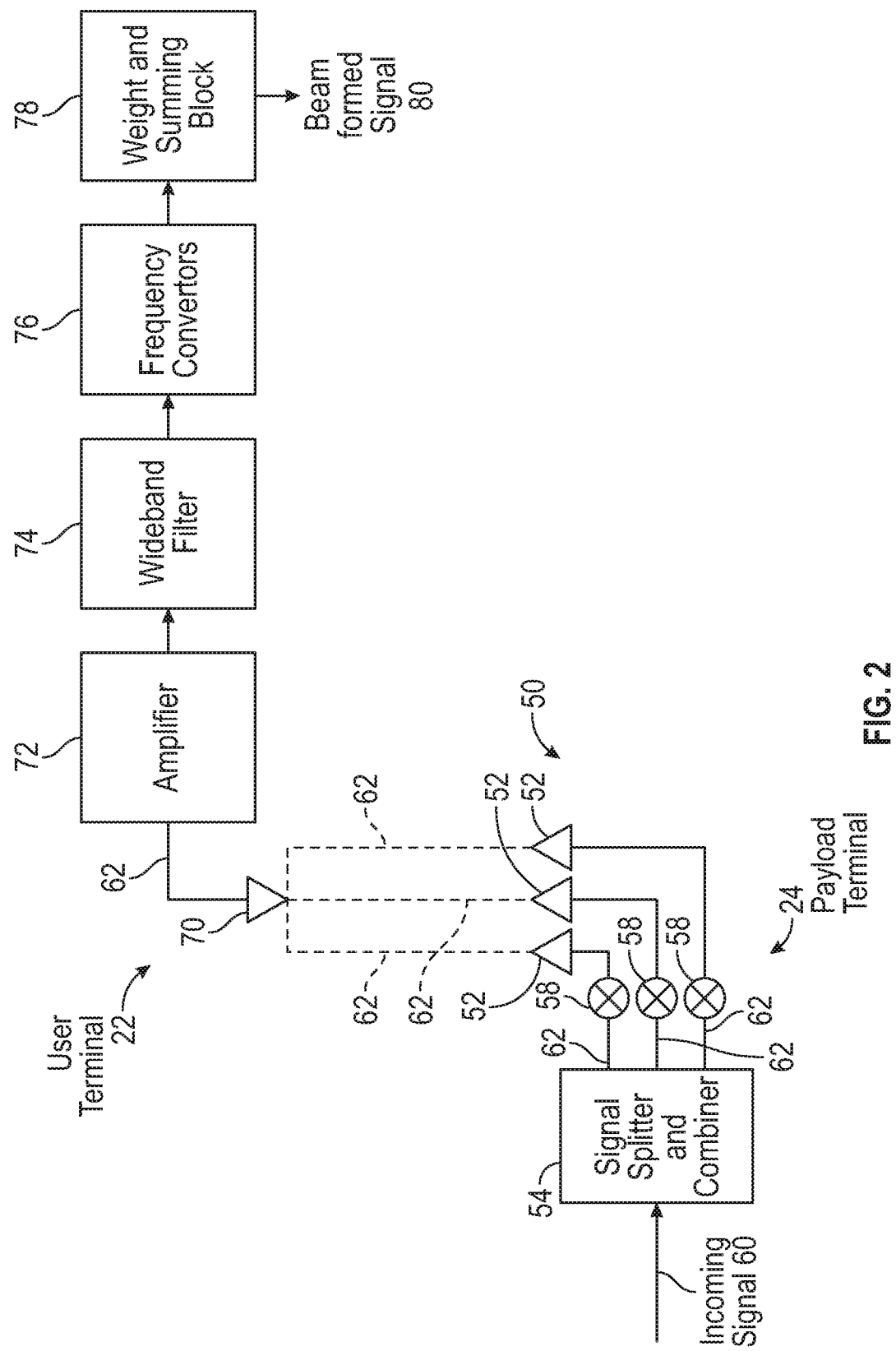
FIG. 2 is a schematic diagram of the platform terminal emitting a plurality of individual wireless signals to the user terminal, according to an exemplary embodiment.

FIG. 2 is a schematic diagram of the platform terminal 24 and one of the user terminals 22, where the platform terminal 24 is in wireless communication with the user terminal 22. The platform terminal 24 includes a signal splitter and combiner 54 and a plurality of multipliers 58 that each correspond to one of the antenna elements 52. It is to be appreciated that the signal processing elements of the platform terminal 24 (i.e., the signal splitter and combiner 54 and the plurality of multipliers 58) may be implemented in analog hardware or, alternatively, in digital hardware.

The platform terminal 24 either generates an incoming signal 60 or, alternatively, receives the incoming signal 60 from an external source such as a satellite (not shown). The signal splitter and combiner 54 is configured to split the incoming signal 60 into two or more individual wireless signals 62. Specifically, the signal splitter and combiner 54 is configured to split the incoming signal 60 into a plurality of individual wireless signals 62, where each individual wireless signal 62 corresponds to a corresponding one of the plurality of antenna elements 52 of the antenna array 50. In other words, the number of individual wireless signals 62 is equal to the number of antenna elements 52 of the antenna array 50. For example, in the embodiment as shown in FIG. 2, three antenna elements 52 are shown. Accordingly, the signal splitter and combiner 54 splits the incoming signal 60 into three individual wireless signals 62. The individual wireless signals 62 are identical to the incoming signal 60. The individual wireless signals 62 each represent a copy of the incoming signal 60. As explained below, the individual wireless signals 62 are separate from each other and provide orthogonal channels for communication by the plurality of antenna elements 52. Alternatively, if the antenna array 50 receives incoming signals, the signal splitter and combiner 54 combines the incoming signals together.

The multipliers 58 are configured to either upconvert or downconvert a center frequency of each of the individual wireless signals 62 into a common center frequency. Specifically, the multipliers 58 perform frequency conversion to ensure the individual wireless signals 62 do not overlap one another in the frequency domain. Alternatively, as mentioned above, the individual wireless signals 62 are orthogonal with respect to one another by code or by time. The individual wireless signals 62 are then sent to a corresponding one of the antenna elements 52 of the antenna array 50.

The plurality of individual wireless signals 62 are transmitted to each of the plurality of user terminals 22 (seen in FIG. 1) by the antenna array 50, where each of the plurality of antenna elements 52 transmits a single individual wireless signal 62. The individual wireless signals 62 are separate from one another, and the wide-area beams 56 (seen in FIG. 1) emitted from each antenna element 52 do not sum together or cancel one another. The individual wireless signals 62 are separable from one another by frequency, time, or code depending upon the specific transmission method used to wirelessly connects the platform terminal 24 to the user terminals 22. There are three types of transmission methods, which include frequency-division multiple access (FDMA), time-division multiple access (TDMA), and code division multiple access (CDMA).

In an embodiment, the platform terminal 24 is in wireless communication with the user terminals 22 based on the FDMA transmission method, where the individual wireless signals 62 are orthogonal to one another by frequency, and where the individual wireless signals 62 are separated from one another by at least one bandwidth. In another embodiment, the platform terminal 24 is in wireless communication with the plurality of user terminals 22 based on the TDMA transmission method, where the individual wireless signals 62 are orthogonal to one another by one another based on time. In other words, there is a lack of simultaneity between the individual wireless signals 62. Similarly, if CDMA is employed, then the individual wireless signals 62 are orthogonal to one another based on coding techniques that ensure the individual wireless signals 62 are separable by applying inverse code at a receiver 70 of the user terminal 22. One example of a coding technique that results in orthogonal channels is Walsh coding.

Referring to both FIGS. 1 and 2, the wide-area beams 56 emitted by each antenna element 52 of the antenna array 50 encompass each of the user terminals 22. In other words, each the user terminal 22 is located within the wide-area beam 56 emitted by each and every antenna element 52 that is part of the antenna array 50. Thus, the user terminal 22 receives each individual wireless signal 62 emitted by the platform terminal 24. As explained below, the user terminal 22 combines the individual wireless signals 62 into a beamformed signal 80.

It is to be appreciated that there is a bandwidth expansion at the platform terminal 24. The bandwidth expansion is based on the number of antenna elements 52. Specifically, the bandwidth expansion is expressed as $B_{EXP}=N_E*B_{OCC}$, where $B_{EXP}$ represents bandwidth expansion, $N_E$ represents the number of antenna elements 52, and $B_{OCC}$ represents the occupied bandwidth. However, unlike ground-based beamforming, the bandwidth expansion does not occur at the gateway terminal 20 and is instead at the platform terminal 24. This may be especially advantageous in situations where the platform terminal 24 is limited in size, weight, and power, and as a result is not able to perform on-board beamforming. Furthermore, it is also to be appreciated that sometimes the platform terminal 24 may be located in an environment that is hostile to digital signal processing. For example, the platform terminal 24 may be in the presence of ionizing radiation.

Figure 3:
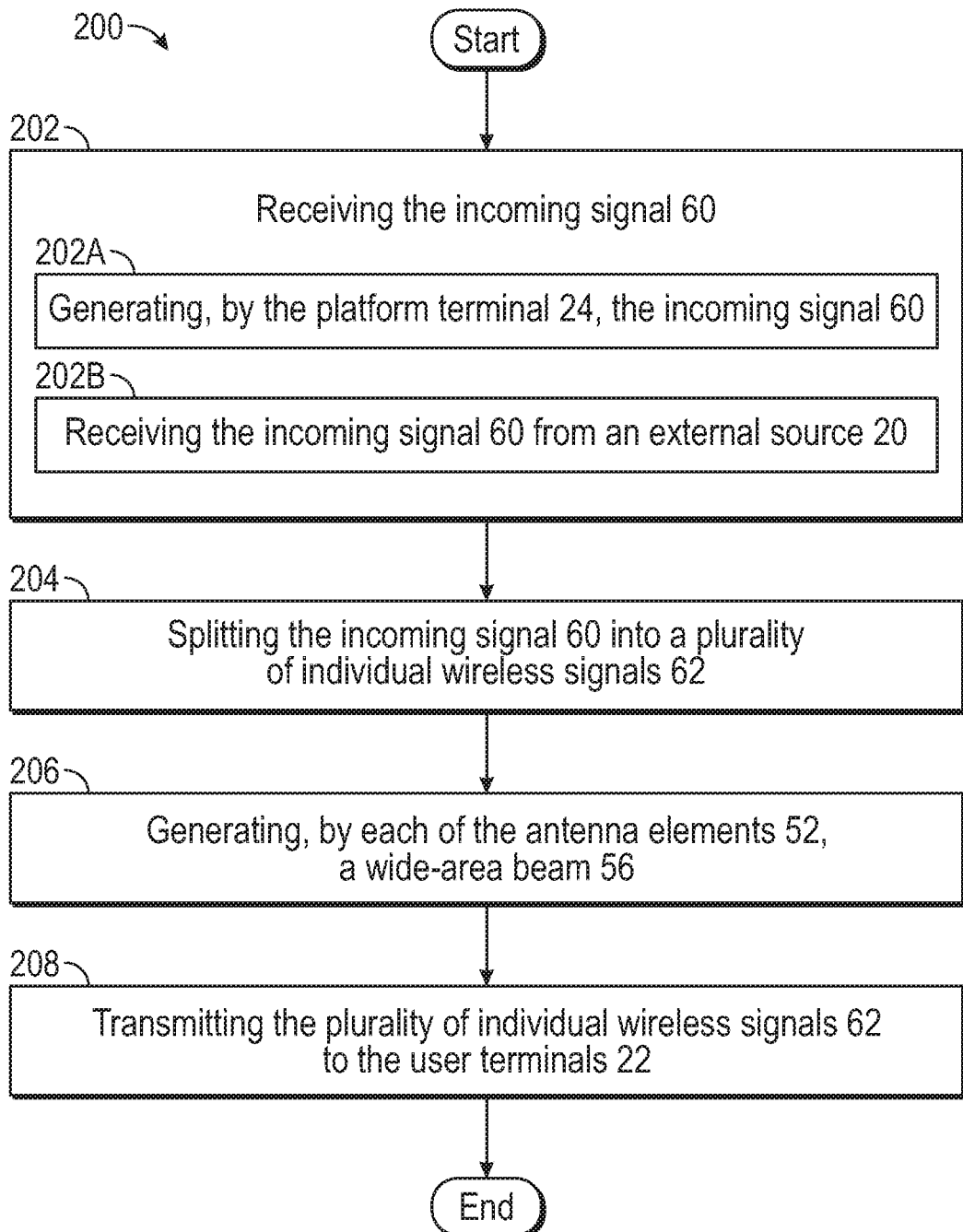
FIG. 3 is a process flow diagram illustrating a method of transmitting the individual wireless signals by the platform terminal, according to an exemplary embodiment.

FIG. 3 is an exemplary process flow diagram illustrating a method 200 of wireless communication between the platform terminal 24 and the plurality of user terminals 22 that are part of the distributed beamforming system 30. Referring to FIGS. 1-3, the method 200 begins at block 202. In block 202, the platform terminal 24 receives the incoming signal 60. In the embodiment of block 202A, the platform terminal 24 generates the incoming signal 60. In the alternative embodiment of block 202B, the platform terminal 24 receives the incoming signal 60 from an external source such as, for example, the gateway terminal 20. The method 200 may then proceed to block 204.

In block 204, the incoming signal 60 is split into the plurality of individual wireless signals 62 by the signal splitter and combiner 54. Each individual wireless signal 62 corresponds to one of the plurality of antenna elements 52 of the antenna array 50 of the platform terminal 24. The method 200 may then proceed to block 206.

In block 206, each of the antenna elements 52 generate a wide-area beam 56 that encompasses each of the plurality of user terminals 22 (seen in FIG. 1). The method 200 may then proceed to block 208.

In block 208, the plurality of individual wireless signals 62 are transmitted to the user terminal 22 by the antenna array 50, where each of the plurality of antenna elements 52 transmit a single individual wireless signal 62 as a wide-area beam 56. As mentioned above, the individual wireless signals 62 are orthogonal with respect to one another. The method 200 may then terminate or proceed back to block 202.

Referring back to FIG. 2, the beamforming processing, which is performed by the user terminals 22, shall now be described. Each individual user terminal 22 includes a receiver 70 configured to receive the plurality of individual wireless signals 62 from the platform terminal 24, an amplifier 72, a wideband filter 74, one or more frequency converters 76, and a weight and summing block 78. The individual user terminal 22 generates a beamformed signal 80. It is to be appreciated that the user terminal 22 includes specific processing elements (seen in FIG. 4) based on the transmission method employed between the platform terminal 24 and the individual user terminal 22, which is explained below. Referring to FIG. 2, the receiver 70 is configured to receive the plurality of individual wireless signals 62. As mentioned above, the plurality of individual wireless signals 62 are transmitted by the platform terminal 24 and are orthogonal with respect to one another.

The amplifier 72 is configured to receive the plurality of individual wireless signals 62 from the platform terminal 24. In an embodiment, the amplifier 72 is a low noise amplifier, which is classified based on gain and linearity. The individual wireless signals 62 are then sent to the wideband filter 74. The wideband filter 74 is in electronic communication with the one or more frequency converters 76 and is configured to pass signals within an occupied frequency and attenuate frequencies outside of the occupied frequency spectrum. The individual user terminal 22 includes a bandwidth expansion that is proportional to the number of antenna elements 52 of the antenna array 50 of the platform terminal 24. It is to be appreciated that the bandwidth expansion occurs at the wideband filter 74. As mentioned above, the bandwidth expansion is expressed as $B_{EXP}=N_E*B_{OCC}$, where $B_{EXP}$ represents bandwidth expansion, $N_E$ represents the number of antenna elements 52 of the platform terminal 24.

Figure 4:
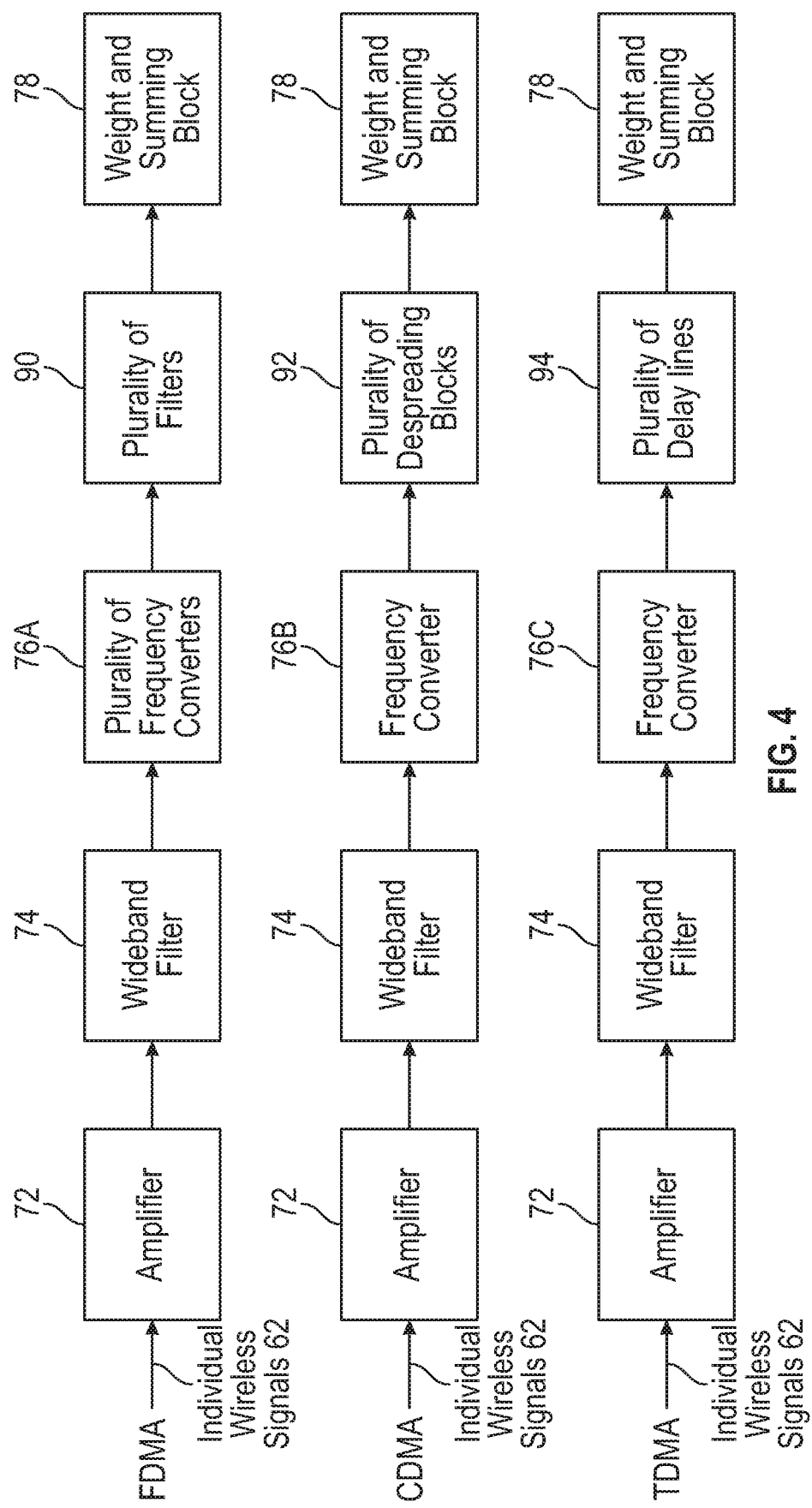
FIG. 4 is a schematic diagram of an individual user terminal, according to an exemplary embodiment.

The one or more frequency converters 76 are configured to transform each of the plurality of individual wireless signals 62 generated by the platform terminal 24 into an intermediate frequency. The specific configuration of the frequency converters 76 are based on the specific transmission method between the platform terminal 24 and the individual user terminal 22 (i.e., FDMA, CDMA, or TDMA). Referring to FIG. 4, if the transmission method is FDMA then user terminal 22 includes a plurality of frequency converters 76A and a plurality of filters 90. The number of frequency converters 76A of the user terminal 22 is equal to the number of antenna elements 52 of the platform terminal 24. Similarly, the number of filters 90 of the user terminal is equal to the number of antenna elements 52 of the platform terminal 24.

Each frequency converter 76A is configured to transform a corresponding individual wireless signal 62 from the platform terminal 24 into the intermediate frequency. Each of the plurality of filters 90 are configured to receive a corresponding individual wireless signal 62 from a corresponding one of the frequency converters 76A. Thus, each filter 90 is configured to pass one of the individual wireless signals 62. The individual wireless signals 62 are then sent to the weight and summing block 78.

The weight and summing block 78 is configured to apply an amplitude weight and a phase shift to each of the plurality of individual wireless signals 62, and then coherently combines the plurality of individual wireless signals 62 together to form the beamformed signal 80. The weight and summing block 78 determines the amplitude weight and the phase shift based on a difference in phase between each of the plurality of antenna elements 52 that are part of the antenna array 50 and the orientation of each antenna element 52 relative to the receiver 70 of the individual user terminal 22. Specifically, the amplitude weight and the phase shift are based on a difference in phase between each antenna element 52 of the antenna array 50 of the platform terminal and the receiver 70 of the user terminal 22. The phase difference between each antenna element 52 and the receiver 70 as well as the distance between each antenna element 52 and the receiver 70 may be communicated in a variety of different formats such as, but not limited to, a static array spacing description, ephemeris knowledge, or attitude knowledge.

Figure 5:
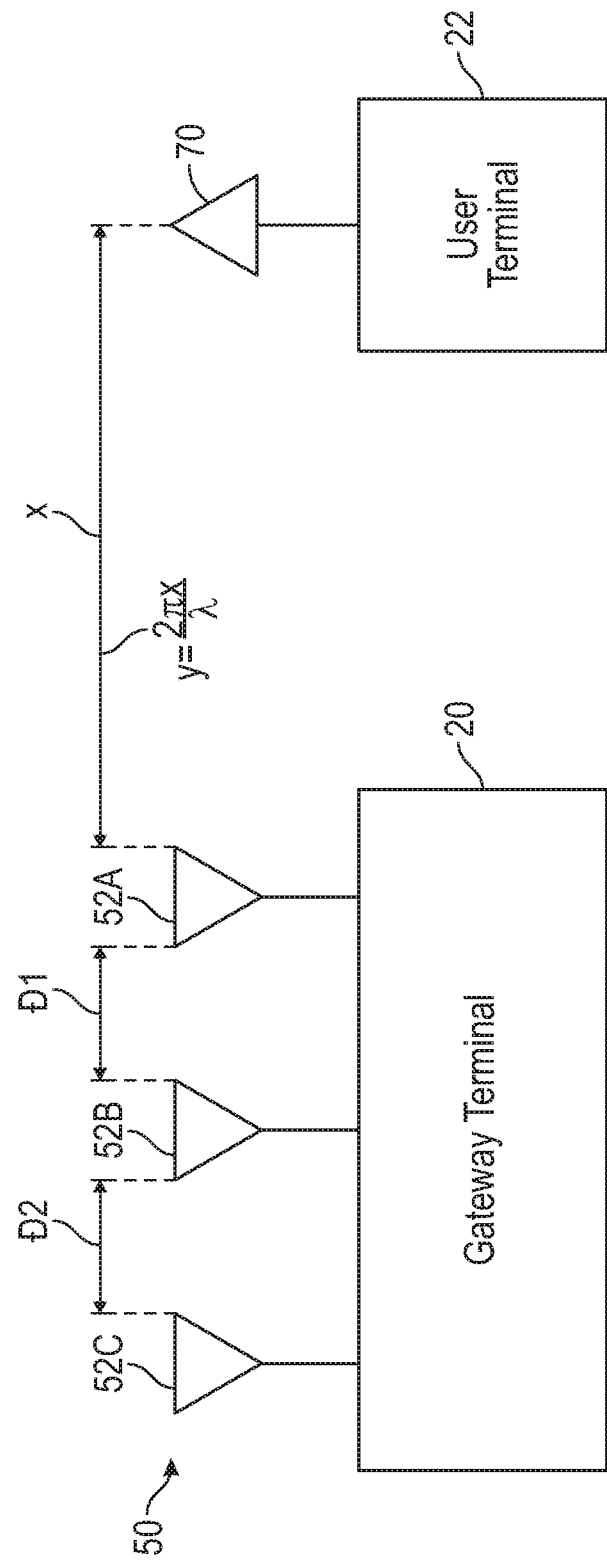
FIG. 5 is a schematic diagram illustrating distances between each individual antenna element of the user terminal and the receiver of an individual user terminal, according to an exemplary embodiment.

For example, in the embodiment as shown in FIG. 5, the antenna element 52A is located at a distance x from the receiver 70 and has a phase shift of y degrees. It is to be appreciated that the phase shift y is proportional to the distance x. Specifically, the relationship between the phase shift y and the distance x is expressed as $y=2\pi/\lambda$, where $\lambda$ represents a wavelength and the phase shift y is expressed in radians. The antenna element 52B is located at a first distance D1 from the antenna element 52A, and the antenna element 52C is located at a second distance D2 from the antenna element 52B. Thus, the phase shift y varies for each of the antenna elements 52. Since the weight and summing block 78 has knowledge of the phase difference between each antenna element 52 and the receiver 70 as well as the distance between each antenna element 52 and the receiver 70, the phase shift y for each antenna element 52 may be calculated. Specifically, the weight and summing block 78 applies an inverse value of the phase shift y, which in turn compensates for the phase shift y and removes the differences in phase shift that occurs between the antenna elements 52.

Referring to FIG. 4, if the transmission method is CDMA then user terminal 22 includes a frequency converter 76B and a plurality of despreading blocks 92 in communication with the frequency converter 76B. Each despreading block 92 is configured to retrieve a corresponding one of the individual wireless signals 62. Thus, the number of despreading blocks 92 is equal to the number of antenna elements 52 of the antenna array 50 of the platform terminal 24 (FIG. 2). Each despreading block combines the corresponding individual wireless signal 62 with a spreading code using an exclusive OR gate (not shown). The individual wireless signals 62 are then sent to the weight and summing block 78. As mentioned above, the weight and summing block 78 is configured to apply the amplitude weight and the phase shift to each of the plurality of individual wireless signals 62, and then coherently combines the plurality of individual wireless signals 62 together to form the beamformed signal 80.

If the transmission method is TDMA, then the user terminal 22 includes a frequency converter 76C and a plurality of plurality of delay lines 94 in electronic communication with the frequency converter 76C, where a delay line 94 is provided for each of the individual wireless signals 62. In other words, the number of delay lines 94 is equal to the number of antenna elements 52 of the antenna array 50 of the platform terminal 24 (FIG. 2). Each delay line 94 is configured to implement a unique time delay to the corresponding individual wireless signal 62. Specifically, the delay lines 94 are configured to implement a sequential time delay between the plurality of individual wireless signals 62. The individual wireless signals 62 are then sent to the weight and summing block 78. As mentioned above, the weight and summing block 78 is configured to apply the amplitude weight and the phase shift to each of the plurality of individual wireless signals 62, and then coherently combines the plurality of individual wireless signals 62 together to form the beamformed signal 80.

Figure 6:
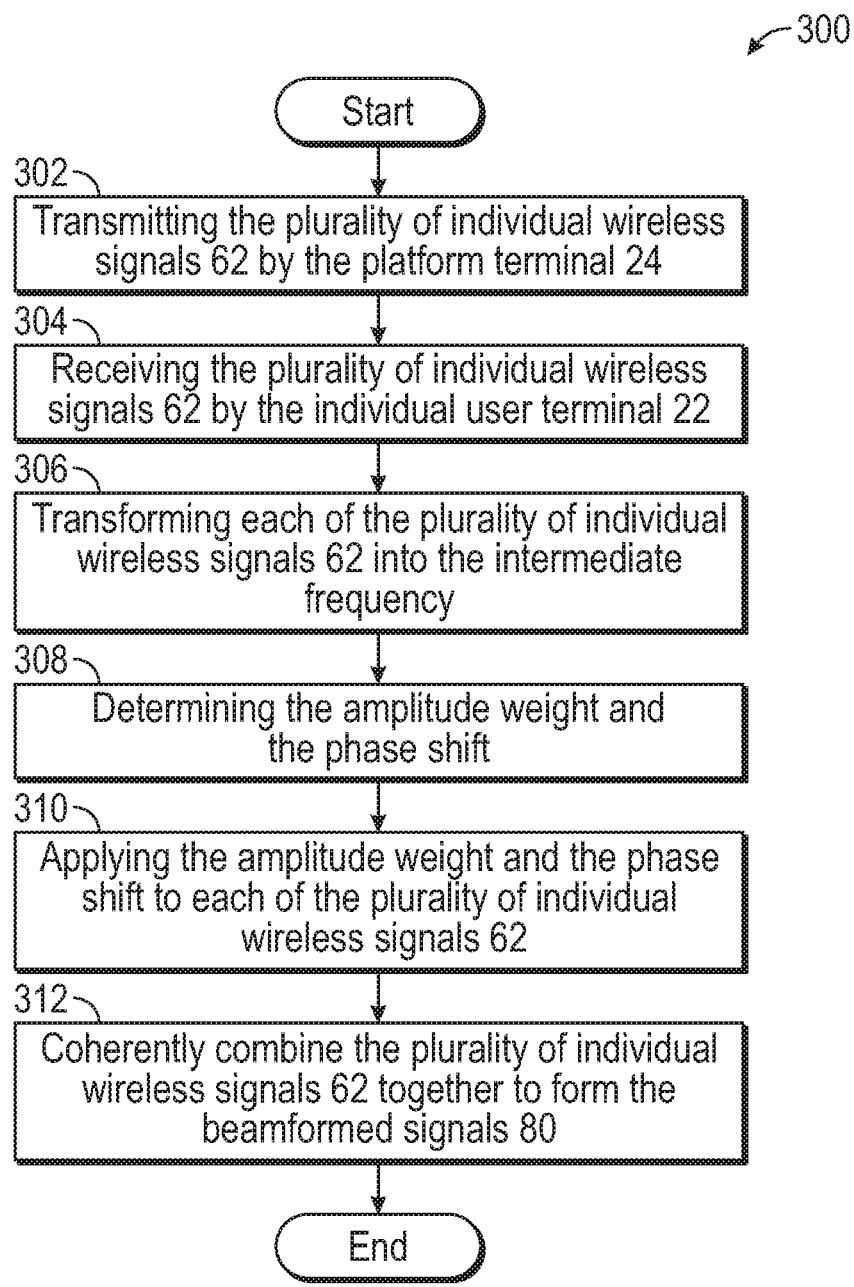
FIG. 6 is a process flow diagram illustrating a method of generating a beamformed signal by an individual user terminal, according to an exemplary embodiment.

Referring now to FIG. 6, a method 300 of creating the beamformed signal 80 by the individual user terminal 22 is disclosed. Referring to FIGS. 1, 2, 4, and 6, the method 200 begins at block 302. In block 302, the platform terminal 24 transmits the plurality of individual wireless signals 62 that are orthogonal with respect to one another. The method 300 may then proceed to block 304.

In block 304, the receiver 70 that is part of the individual user terminal 22 receives the plurality of individual wireless signals 62. The method 300 may then proceed to block 306.

In block 306, the one or more frequency converters 76 transform each of the plurality of individual wireless signals 62 generated by the platform terminal 24 into the intermediate frequency. As seen in FIG. 4, the specific configuration of the one or more frequency converters 76 is based on the specific transmission method between the platform terminal 24 and the individual user terminal 22 (i.e., FDMA, CDMA, or TDMA). The method 300 may then proceed to block 308.

In block 308, the amplitude weight and the phase shift are determined by the weight and summing block 78 (FIG. 4) based on a difference in phase between each antenna element 52 of the antenna array 50 of the platform terminal 24 and the receiver 70 of the individual user terminal 22. The method 300 may then proceed to block 310.

In block 310, the amplitude weight and the phase shift are applied to each of the plurality of individual wireless signals 62. The method 300 may then proceed to block 312.

In block 312, the plurality of individual wireless signals 62 are coherently combined together to form the beamformed signal 80. The method 300 may then terminate.

Referring generally to the figures, the disclosed distributed beamforming system provides various technical effects and benefits. Specifically, unlike conventional beamforming systems, the distributed beamforming system performs the beamforming processing at the user terminals. As a result, it is not necessary for the platform terminal to have knowledge of the location of each user terminal. It is also unnecessary for the platform terminal to track the location of any mobile user terminals that change location. Additionally, the user terminals do not need to reveal their location to the platform terminal. The distributed beamforming system scales to a large number of user without the need to increase array complexity. Accordingly, the disclosed beamforming system may be especially advantageous for low-rate data communications systems that employ a large number of users.

Figure 7:
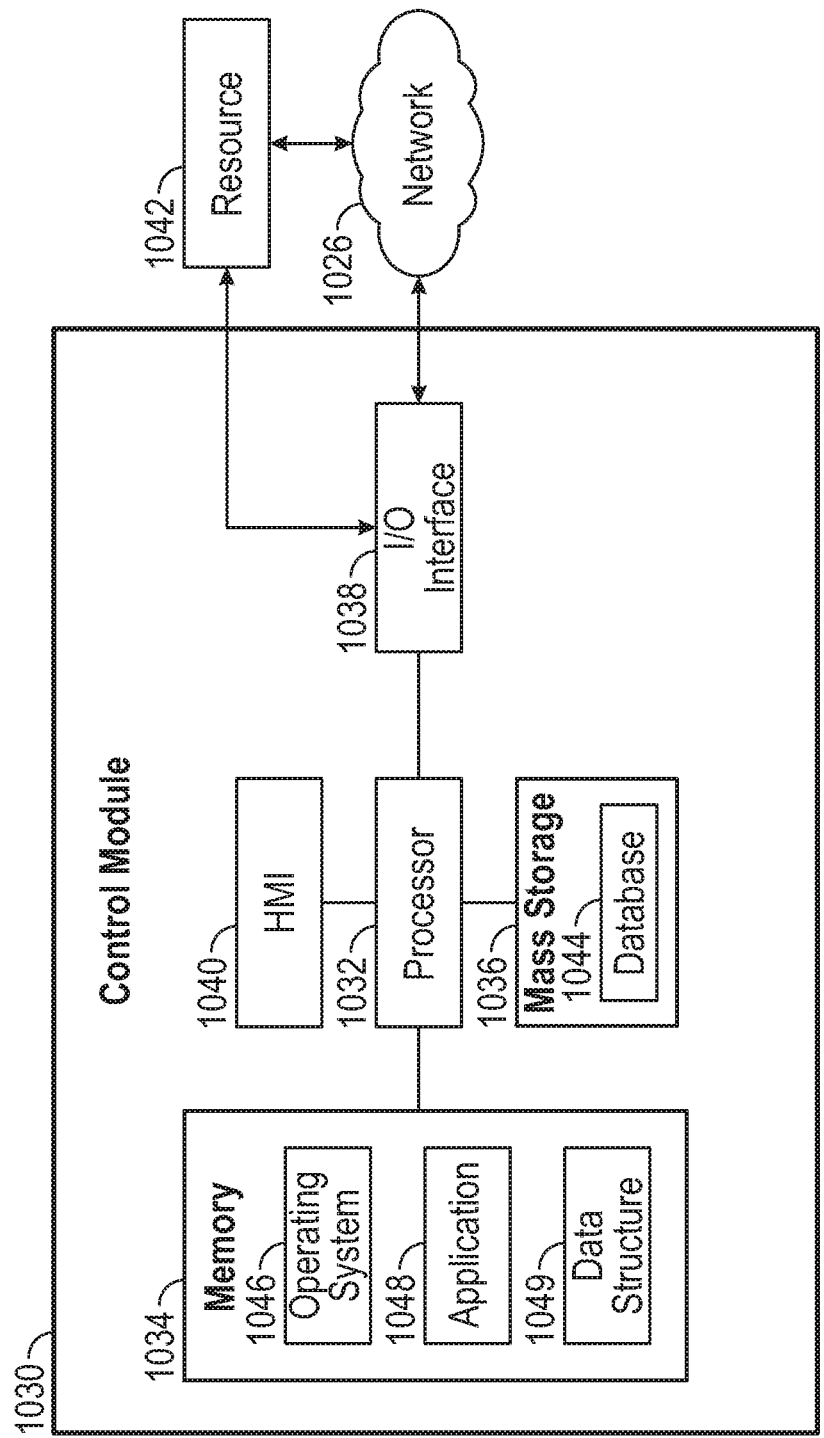
FIG. 7 is an exemplary computer system for the platform terminal and the user terminals, according to an exemplary embodiment.

Referring now to FIG. 7, the user terminals 22 and the platform terminal 24 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A distributed beamforming system including a platform terminal and a plurality of user terminals, the platform terminal comprising:
    an antenna array including a plurality of antenna elements, wherein each antenna element transmits a wide-area beam configured to encompass each of the plurality of user terminals;
    one or more processors in electronic communication with the antenna array; and
    a memory coupled to the one or more processors, the memory storing data into a database and program code that, when executed by the one or more processors, causes the platform terminal to:
    receive or generate an incoming signal;
    split the incoming signal into a plurality of individual wireless signals, wherein each individual wireless signal corresponds to one of the plurality of antenna elements of the antenna array; and
    transmit the plurality of individual wireless signals to each user terminal by the antenna array, wherein each antenna element transmits a single individual wireless signal, and wherein the plurality of individual wireless signals are orthogonal with respect to one another.

2. The distributed beamforming system of claim 1, wherein the platform terminal is in wireless communication with the plurality of user terminals based on a frequency-division multiple access (FDMA) transmission method.

3. The distributed beamforming system of claim 2, wherein the plurality of individual wireless signals are orthogonal to one another by frequency.

4. The distributed beamforming system of claim 1, wherein the platform terminal is in wireless communication with the plurality of user terminals based on a time-division multiple access (TDMA) transmission method.

5. The distributed beamforming system of claim 4, wherein the plurality of individual wireless signals are orthogonal to one another by time.

6. The distributed beamforming system of claim 1, wherein the platform terminal is in wireless communication with the plurality of user terminals based on a code division multiple access (CDMA) transmission method.

7. The distributed beamforming system of claim 6, wherein the plurality of individual wireless signals are orthogonal to one another by coding techniques.

8. The distributed beamforming system of claim 1, wherein the wide-area beam emitted by each of the antenna elements overlap one another to define an area of uncertainty.

9. The distributed beamforming system of claim 8, wherein the area of uncertainty represents an area where each of the plurality of user terminals are located.

10. The distributed beamforming system of claim 8, wherein the area of uncertainty accounts for movement by the plurality of user terminals.

11. The distributed beamforming system of claim 8, wherein a number of antenna elements of the antenna array is equal to a total number of user terminals that are located within the area of uncertainty.

12. The distributed beamforming system of claim 1, wherein the platform terminal includes a multiplier configured to either upconvert or downconvert a center frequency of each of the plurality of individual wireless signals into a common center frequency.

13. The distributed beamforming system of claim 1, wherein the platform terminal receives the incoming signal from an external source.

14. The distributed beamforming system of claim 1, further comprising a signal splitter and combiner configured to split the incoming signal into the plurality of individual wireless signals.

15. A method of wireless communication between a platform terminal and a plurality of user terminals that are part of a distributed beamforming system, the method comprising:
  receiving or generating, by the platform terminal, an incoming signal;
  splitting the incoming signal into a plurality of individual wireless signals, wherein each individual wireless signal corresponds to one of a plurality of antenna elements of an antenna array of the platform terminal; and
  transmitting the plurality of individual wireless signals to each user terminal by the antenna array, wherein each of the plurality of antenna elements transmits a single individual wireless signal as a wide-area beam that encompasses each of the plurality of user terminals, and wherein the individual wireless signals are orthogonal with respect to one another.

16. The method of claim 15, wherein the wide-area beam emitted by each of the plurality of antenna elements is sized to encompass an area of uncertainty.

17. The method of claim 15, further comprising:
  receiving the incoming signal by an external source.

18. The method of claim 15, wherein the plurality of individual wireless signals are orthogonal to one another by time, frequency, or coding techniques.

19. The method of claim 15, wherein the incoming signal is split into the plurality of individual wireless signals by a signal splitter and combiner that is part of the platform terminal.

20. The method of claim 15, further comprising:
  either upconverting or downconverting a center frequency of each of the plurality of individual wireless signals into a common center frequency by a multiplier.

\* \* \* \* \*